(12) United States Patent
Hessler et al.

(10) Patent No.: US 11,130,098 B2
(45) Date of Patent: Sep. 28, 2021

(54) METHOD OF MAKING CARBON MOLECULAR SIEVE MEMBRANES

(71) Applicants: Dow Global Technologies LLC, Midland, MI (US); Georgia Tech Research Corporation, Atlanta, GA (US)

(72) Inventors: John Hessler, Ellsworth, ME (US); William J. Koros, Atlanta, GA (US); Liren Xu, Pearland, TX (US); Mark K. Brayden, Baton Rouge, LA (US); Marcos V. Martinez, Rosharon, TX (US)

(73) Assignee: Dow Global Technologies LLC, Midland, MI (US)

( * ) Notice: Subject to any disclaimer, the term of this patent is extended or adjusted under 35 U.S.C. 154(b) by 527 days.

(21) Appl. No.: 16/062,118

(22) PCT Filed: Nov. 30, 2016

(86) PCT No.: PCT/US2016/064115
§ 371 (c)(1),
(2) Date: Jun. 14, 2018

(87) PCT Pub. No.: WO2017/105836
PCT Pub. Date: Jun. 22, 2017

(65) Prior Publication Data
US 2018/0369761 A1   Dec. 27, 2018

Related U.S. Application Data

(60) Provisional application No. 62/268,556, filed on Dec. 17, 2015.

(51) Int. Cl.
*B01D 53/22* (2006.01)
*B01D 71/02* (2006.01)
*B01D 67/00* (2006.01)
*B01D 71/64* (2006.01)
*B01D 69/08* (2006.01)

(52) U.S. Cl.
CPC .......... *B01D 71/021* (2013.01); *B01D 53/22* (2013.01); *B01D 53/228* (2013.01); *B01D 67/0002* (2013.01); *B01D 67/0067* (2013.01); *B01D 67/0081* (2013.01); *B01D 67/0083* (2013.01); *B01D 69/08* (2013.01); *B01D 71/028* (2013.01); *B01D 71/64* (2013.01); *B01D 69/088* (2013.01); *B01D 2256/10* (2013.01); *B01D 2256/24* (2013.01); *B01D 2257/104* (2013.01); *B01D 2257/7022* (2013.01); *B01D 2321/32* (2013.01); *Y02C 20/20* (2013.01)

(58) Field of Classification Search
CPC .......... Y02C 20/20; B01D 67/0002; B01D 2256/24; B01D 2257/104; B01D 69/088; B01D 69/08; B01D 2256/10; B01D 2257/7022; B01D 53/228; B01D 71/021; B01D 71/64; B01D 71/028; B01D 53/22; B01D 67/0081; B01D 2321/32; B01D 67/0083; B01D 67/0067
See application file for complete search history.

(56) References Cited

U.S. PATENT DOCUMENTS

| | | | |
|---|---|---|---|
| 2,996,429 A * | 8/1961 | Toulmin, Jr. ........... | C12M 27/10 435/391 |
| 5,288,304 A | 2/1994 | Koros et al. | |
| 6,565,631 B2 | 5/2003 | Koros et al. | |
| 8,709,133 B2 | 4/2014 | Kiyono et al. | |
| 8,911,534 B2 | 12/2014 | Koros et al. | |
| 2002/0000404 A1* | 1/2002 | Mutsakis ............. | B01D 63/061 210/323.2 |
| 2013/0152793 A1 | 6/2013 | Bhuwania et al. | |
| 2014/0000454 A1* | 1/2014 | Singh ................... | B01D 53/228 95/50 |
| 2015/0094445 A1 | 4/2015 | Bhuwania et al. | |
| 2015/0132504 A1* | 5/2015 | Chen ..................... | B01D 53/228 427/569 |

(Continued)

FOREIGN PATENT DOCUMENTS

| | | |
|---|---|---|
| EP | 0459623 | 12/1991 |
| EP | 2844368 A1 | 3/2015 |
| WO | 2012148563 A1 | 11/2012 |

OTHER PUBLICATIONS

Menendez et al, Aging of carbon membranes under different environments, Carbon, 2001, 39, 733-740.

(Continued)

*Primary Examiner* — Anthony R Shumate
(74) *Attorney, Agent, or Firm* — Dinsmore & Shohl LLP

(57) ABSTRACT

The invention is an improved method of making a carbon molecular sieve (CMS) membrane in which a precursor polymer is pyrolyzed to form a carbon molecular sieve membrane that is then exposed to a conditioning atmosphere comprised of a target permeate gas molecule such as ethylene when the membrane is desired to separate it from a light hydrocarbon gas stream. The exposure to the ethylene desirably occurs prior to the CMS permeance and selectivity combination substantially changing (e.g., within 5 days) of cooling from the pyrolyzing temperature. The CMS membranes have shown an improved combination of selectivity and permeance as well as stability and are useful to separate gases in gas streams such methane from natural gas, oxygen from air and ethylene or propylene from light hydrocarbon streams.

13 Claims, No Drawings

(56) References Cited

U.S. PATENT DOCUMENTS

| | | | |
|---|---|---|---|
| 2017/0120200 A1* | 5/2017 | Lee | B01D 71/021 |
| 2018/0229181 A1* | 8/2018 | Zhang | C07C 7/13 |
| 2019/0030491 A1* | 1/2019 | Zhang | C01B 32/50 |
| 2019/0054427 A1* | 2/2019 | Zhang | B01J 27/20 |
| 2019/0099722 A1* | 4/2019 | Hessler | B01D 67/0067 |
| 2019/0176090 A1* | 6/2019 | Lee | B01D 69/02 |
| 2019/0275471 A1* | 9/2019 | Xu | B01D 69/08 |
| 2020/0254393 A1* | 8/2020 | Xu | B01D 69/08 |
| 2020/0276542 A1* | 9/2020 | Chu | B01D 69/142 |

OTHER PUBLICATIONS

Williams, Paul Jason, Analysis of Factors Influencing the Performance of CMS Membrane for Gas Separation, Georgia Institute of Technology, Aug. 2006.

Steel et al, An investigation of the effects of pyrolysis parameters on gas separation properties of carbon materials, Science Direct, Elsevier, 2005, 43, 1843-1856.

Yampolskii, Yuri, Polymeric Gas Separation Membranes, Macromolecules, 2012, 45, 3298-3311, Moscow.

Rungta et al, Carbon molecular sieve dense film membranes derived from Matrimid for ethylene/ethane separation, Science Direct, Elsevier, 2012, 50, 1488-1502, Atlanta.

Kiyono et al, Effect of polymer precursors on carbon molecular sieve structure and separation performance properties, Science Direct, Elsevier, 2010, 48, 4432-4441, Atlanta.

Kiyono et al, Effect of pyrolysis atmosphere on separation performance of carbon molecular sieve membranes, Journal of Membrane Science, Elsevier, 2010, 359, 2-10, Atlanta.

Kiyono et al, Generalization of effect of oxygen exposure on formation and performance of carbon molecular sieve membranes, Science Direct, Elsevier, 2010, 48, 4442-4449, Atlanta.

Geiszler et al, Effects of Polyimide Pyrolysis Conditions on Carbon Molecular Sieve Membrane Properties, American Chemical Society, University of Texas at Austin, 1996, 35, 2999-3003.

Lagorsse et al, Aging study of carbon molecular sieve membranes, Journal of Membrane Science, Elsevier, 2007, 310, 494-502.

Xu et al, Physical aging in carbon molecular sieve membranes, Science Direct, Elsevier, 2014, 80, 155-166.

Menendez I et al: "Aging of carbon membranes under different environments", Carbon, Elsevier, Oxford, GB.

Paul Jason Williams, Analysis of Factors Influencing the Performance of CMS Membranes for Gas Separation, Georgia Institute of Technology, Aug. 2006.

Koros et al, An investigation of the effects of pyrolysis parameters on gas separation properties of carbon materials, Carbon, Elsevier, Oxford, Atlanta.

Yuri Yampolskii, Macromolecules, 2012, 45, 3298-3311, Moscow.

Koros et al, Carbon molecular sieve dense film membranes derived from Matrimid for ethylene/ethane separation, Carbon, Elsevier, 2011, Atlanta.

Kiyono et al, Effect of polymer precursors on carbon molecular sieve structure and separation performance properties, Carbon, Elsevier, 2010, Atlanta.

Kiyono et al, Effect of pyrolysis atmosphere on separation performance of carbon molecular sieve membranes, Carbon, Elsevier, 2009, Atlanta.

Kiyono et al, Generalization of effect of oxygen exposure on formation and performance of carbon molecular sieve membranes, Elsevier, 2009, Atlanta.

Koros et al, Effects of Polyimide Pyrolysis Conditions on Carbon Molecular Sieve Membrane Properties, University of Texas at Austin, 1996, 35, 2999-3003.

Office Action pertaining to corresponding Japanese Patent Application No. 2018-528035, dated Sep. 29, 2020.

* cited by examiner

METHOD OF MAKING CARBON MOLECULAR SIEVE MEMBRANES

FIELD OF THE INVENTION

The invention relates to carbon molecular sieve (CMS) membranes for use in gas separation. In particular the invention relates to a method for producing CMS membranes with improved selectivity, permeability and stability.

BACKGROUND OF THE INVENTION

Membranes are widely used for the separation of gases and liquids, including for example, separating acid gases, such as $CO_2$ and $H_2S$ from natural gas, and the removal of $O_2$ from air. Gas transport through such membranes is commonly modeled by the sorption-diffusion mechanism. Currently, polymeric membranes are well studied and widely available for gaseous separations due to easy process-ability and low cost. CMS membranes, however, have been shown to have attractive separation performance properties exceeding that of polymeric membranes.

CMS membranes are typically produced through thermal pyrolysis of polymer precursors. For example, it is known that defect-free hollow fiber CMS membranes can be produced by pyrolyzing cellulose hollow fibers (J. E. Koresh and A. Soffer, Molecular sieve permselective membrane. Part I. Presentation of a new device for gas mixture separation. Separation Science and Technology, 18, 8 (1983)). In addition, many other polymers have been used to produce CMS membranes in fiber and dense film form, among which polyimides have been favored. Polyimides have a high glass transition temperature, are easy to process, and have one of the highest separation performance properties among other polymeric membranes, even prior to pyrolysis.

U.S. Pat. No. 6,565,631 to Koros et al., which is incorporated herein by reference, describes a method of synthesizing CMS membranes. In particular, a polyimide hollow fiber was placed in a pyrolysis furnace with an evacuated environment, with a pyrolysis pressure of between 0.01 and 0.10 mm Hg air. U.S. Pat. No. 6,565,631 also discloses a method of using CMS membranes to separate $CO_2$ from a methane stream containing 10% $CO_2$, at 1000 psia and 50° C., with a selectivity of approximately 45, a selectivity that is much higher than typical commercial polymeric membranes. Other patents that describe processes for producing carbon membranes (both asymmetric hollow "filamentary" and flat sheets), and applications for gas separation, include U.S. Pat. No. 5,288,304, and EP Patent No. 0459623, which are incorporated herein in their entireties.

Prior research has shown that CMS membrane separation properties are primarily affected by the following factors: (1) pyrolysis precursor, (2) pyrolysis temperature, (3) thermal soak time, and (4) pyrolysis atmosphere. For example, Steel and Koros performed a detailed investigation of the impact of pyrolysis temperature, thermal soak time, and polymer composition on the performance of carbon membranes. (K. M. Steel and W. J. Koros, Investigation of Porosity of Carbon Materials and Related Effects on Gas Separation Properties, Carbon, 41, 253 (2003).) Membranes were produced in an air atmosphere at 0.05 mm Hg pressure. The results showed that increases in both temperature and thermal soak time increased the selectivity but decreased permeance for $CO_2/CH_4$ separation. In addition, Steel et al showed that a precursor polymer with a rigid, tightly packed structure tends to lead to a CMS membrane having higher selectivity compared with less rigid precursor polymers.

The impact of pyrolysis atmosphere has been researched only to a limited extent. Suda and Haraya disclosed the formation of CMS membranes under different environments. (H. Suda and K. Haraya, Gas Permeation Through Micropores of Carbon Molecular Sieve Membranes Derived From Kapton Polyimide, J. Phys. Chem. B, 101, 3988 (1997).) CMS dense films were prepared from polyimide Kapton® at 10000° C. in either argon or in vacuum. According to their gas separation properties, the results of an $O_2/N_2$ separation were almost the same between 6 membranes formed under the different atmospheres. Suda and Haraya did not disclose the effects of atmosphere on $CO_2$ separation from natural gas, nor disclose how separation properties vary with ability and low cost. Similarly, Geiszler and Koros disclosed the results of CMS fibers produced from pyrolysis of fluorinated polyimide in helium and argon for both $O_2/N_2$ and $H_2/N_2$ separations. (V. C. Geiszler and W. J. Koros, Effects of Polyimide Pyrolysis Atmosphere on Separation Performance of Carbon Molecular Sieve Membranes, J. Memb. Sci., (2009).). That paper disclosed a slightly higher selectivity with vacuum pyrolysis than the purged pyrolysis processes. In addition, Geiszler and Koros showed that the flow rate of the purge gases impacted performance. Geiszler and Koros, however, did not disclose the effects of atmosphere on $CO_2$ separation from natural gas, or the effects of oxygen concentration on separation properties. None of the aforementioned describe the long term use of the CMS membranes and the stability of the membranes to maintain the permeance and selectivity for particular gas molecules of interest. The aforementioned also fail to describe methods of optimizing and improving the selectivity and permeance for a desired retentate gas molecule with improved stability of the same.

More recently, CMS membranes have been discovered to undergo substantial aging that deleteriously affects the performance as described by Liren Xu, et al., *Physical Aging in Carbon Molecular Sieve Membranes, Carbon*, 80 (2014) 155-166. For example, the permeance of a desired gas retentate molecule may be reduced by a factor of 2 to 4 within 5 days of cooling to room temperature with only a very small increase in selectivity (e.g., 10% or so).

It would be desirable to provide a method to make a CMS membrane and CMS membrane made by the method that addresses one or more of the problems of the prior art such as one described above. For example, it would be desirable to provide a CMS membrane that has an improved combination of selectivity and permeance for particular permeate gas molecule/retentate gas molecules. It would also be desirable to have such CMS membrane maintain the same selectivity and permeance whether being stored for use or while being used (i.e., stable).

SUMMARY OF THE INVENTION

A first aspect of the invention is a carbon molecular sieve membrane comprising,
  (i) providing a precursor polymer;
  (ii) heating said precursor polymer to a temperature where the precursor polymer undergoes pyrolysis to form the carbon molecular sieve membrane;
  (iii) cooling the carbon molecular sieve membrane to a temperature where no further pyrolysis occurs; and
  (iv) exposing the carbon molecular sieve membrane to a conditioning atmosphere comprised of a target permeate gas molecule.

The method of the invention may realize a CMS that has an improved combination of selectivity and permeance.

Illustratively, the method allows for CMS membrane having good selectivity for similar sized gas molecules (e.g., ethylene/ethane and propylene/propane) while still having higher permeance of the target permeate gas molecule (e.g., ethylene or propylene). In addition it has been discovered that the method may improve the stability of the CMS membrane (i.e., substantially retains the permeance and selectivity in a feedstock gas).

A second aspect of the invention is carbon molecular sieve made by the process of the first aspect.

A third aspect of the invention is a process for separating a gas molecule from a gas feed comprised of the gas molecule and at least one other gas molecule comprising
(i) providing the carbon molecular sieve membrane of the first aspect of the invention; and dianhydride (PMDA), 1,4,5,8-naphthalene tetracarboxylic dianhydride (NTDA), and benzophenone tetracarboxylic dianhydride (BTDA), with two or more of 6FDA, BPDA and DAM being preferred.

A particularly useful polyimide, designated as 6FDA/BPDA-DAM, may be synthesized via thermal or chemical processes from a combination of three monomers: DAM; 6FDA, and BPDA, each commercially available for example from Sigma-Aldrich Corporation. Formula 1 below shows a representative structure for 6FDA/BPDA-DAM, with a potential for adjusting the ratio between X and Y to tune polymer properties. As used in examples below, a 1:1 ratio of component X and component Y may also abbreviated as 6FDA/BPDA(1:1)-DAM.

Formula 1

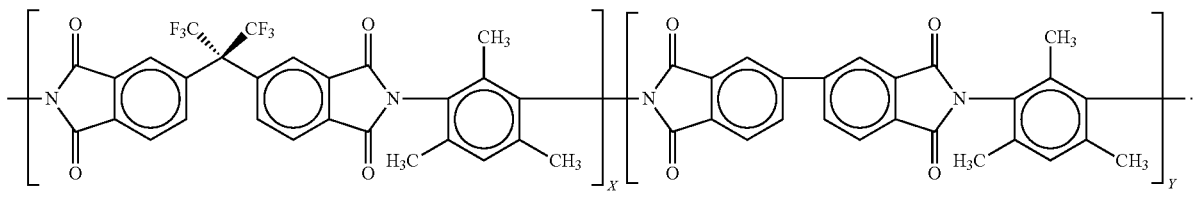

Chemical structure of 6FDA/BPDA-DAM (ii) flowing the gas feed through said carbon molecular sieve membrane to produce a first stream having an increased concentration of the gas molecule and a second stream having an increased concentration of the other gas molecule.

A fourth aspect of the invention is a carbon molecular sieve module comprising a sealable enclosure comprised of: a plurality of carbon molecular sieve membranes that is comprised of at least one carbon molecular sieve membrane of the first aspect and said membranes are contained within the sealable enclosure; an inlet for introducing a gas feed comprised of at least two differing gas molecules; a first outlet for permitting egress of a permeate gas stream; and a second outlet for egress of a retentate gas stream.

The gas separation method is particularly useful for separating gas molecules in gas feeds that have very similar molecular sizes such as ethane/ethylene and propane/propylene. It may also be used to separate gases from atmospheric air such as oxygen or separating gases (e.g., methane) in natural gas feeds.

DETAILED DESCRIPTION OF THE INVENTION

The precursor polymer may be any useful polymer for making CMS membranes, with polyimides generally being suitable. The polyimide may be a conventional or fluorinated polyimide. Desirable polyimides typically contain at least two different moieties selected from 2,4,6-trimethyl-1,3-phenylene diamine (DAM), oxydianaline (ODA), dimethyl-3,7-diaminodiphenyl-thiophene-5,5'-dioxide (DDBT), 3,5-diaminobenzoic acide (DABA), 2,3,5,6-tetramethyl-1,4-phenylene diamine (durene), meta-phenylenediamine (m-PDA), 2,4-diaminotoluene (2,4-DAT), tetramethylmethylenedianaline (TMMDA), 4,4'-diamino 2,2'-biphenyl disulfonic acid (BDSA); 5,5'-[2,2,2-trifluoro-1-(trifluoromethyl)ethylidene]-1,3-isobenzofurandion (6FDA), 3,3',4,4'-biphenyl tetracarboxylic dianhydride (BPDA), pyromellitic A second particularly useful polyimide, designated as 6FDA-DAM lacks BPDA such that Y equals zero in Formula 1 above. Formula 2 below shows a representative structure for this polyimide.

Formula 2

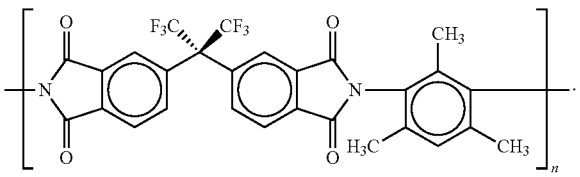

Chemical structure of 6FDA-DAM

A third useful polyimide is MATRIMID™ 5218 (Huntsman Advanced Materials), a commercially available polyimide that is a copolymer of 3,3',4,4'-benzo-phenonetetracarboxylic acid dianhydride and 5(6)-amino-1-(4'-aminophenyl)-1,3,3-trimethylindane (BTDA-DAPI).

Preferred polymeric precursor hollow fiber membranes, the hollow fibers as produced but not pyrolyzed, are substantially defect-free. "Defect-free" means that selectivity of a gas pair, typically oxygen ($O_2$) and nitrogen ($N_2$), through a hollow fiber membrane is at least 90 percent of the selectivity for the same gas pair through a dense film prepared from the same composition as that used to make the polymeric precursor hollow fiber membrane. By way of illustration, a 6FDA/BPDA(1:1)-DAM polymer has an intrinsic $O_2/N_2$ selectivity (also known as "dense film selectivity") of 4.1.

The precursor polymers are typically formed into hollow fibers or films. Conventional procedures to make these may be used. For example, coextrusion procedures including such as a dry-jet wet spinning process (in which an air gap exists between the tip of the spinneret and the coagulation or quench bath) or a wet spinning process (with zero air-gap distance) may be used to make the hollow fibers.

Pyrolysis conditions influence carbon membrane physical properties and, accordingly, are chosen with care. Any suitable supporting means for holding the CMS membranes may be used during the pyrolysis including sandwiching between two metallic wire meshes or using a stainless steel mesh plate in combination with stainless steel wires and as described by U.S. Pat. No. 8,709,133 at col. 6 line 58 to col. 7, line 4, which is incorporated by reference.

Precursor polymers may be pyrolyzed to form the CMS membranes (i.e., carbonize the precursor polymer) under various inert gas purge or vacuum conditions, preferably under inert gas purge conditions, for the vacuum pyrolysis, preferably at low pressures (e.g. less than 0.1 millibar). U.S. Pat. No. 6,565,631 describes a heating method for pyrolysis of polymeric fibers to form CMS membranes, and is incorporated herein by reference. For either polymeric films or fibers, a pyrolysis temperature of between about 450° C. to about 800° C. may advantageously be used. The pyrolysis temperature may be adjusted in combination with the pyrolysis atmosphere to tune the performance properties of the resulting CMS membrane. For example, the pyrolysis temperature may be 1000° C. or more. Optionally, the pyrolysis temperature is maintained between about 500° C. and about 550° C. The pyrolysis soak time (i.e., the duration of time at the pyrolysis temperature) may vary (and may include no soak time) but advantageously is between about 1 hour to about 10 hours, alternatively from about 2 hours to about 8 hours, alternatively from about 4 hours to about 6 hours. An exemplary heating protocol may include starting at a first set point of about 500° C., then heating to a second set point of about 250° C. at a rate of about 13.3° C. per minute, then heating to a third set point of about 535° C. at a rate of about 3.85° C. per minute, and then a fourth set point of about 550° C. at a rate of about 0.25° C. per minute. The fourth set point is then optionally maintained for the determined soak time. After the heating cycle is complete, the system is typically allowed to cool while still under vacuum or in a controlled atmosphere.

Precursor polymers may be carbonized under various inert gas purge or vacuum conditions, preferably under inert gas purge conditions, for the vacuum pyrolysis, preferably at low pressures (e.g. less than 0.1 millibar). In one embodiment the pyrolysis utilizes a controlled purge gas atmosphere during pyrolysis in which low levels of oxygen are present in an inert gas. By way of example, an inert gas such as argon is used as the purge gas atmosphere. Other suitable inert gases include, but are not limited to, nitrogen, helium, or any combinations thereof. By using any suitable method such as a valve, the inert gas containing a specific concentration of oxygen may be introduced into the pyrolysis atmosphere. For example, the amount of oxygen in the purge atmosphere may be less than about 50 ppm (parts per million) $O_2$/Ar. Alternatively, the amount of oxygen in the purge atmosphere may be less than 40 ppm $O_2$/Ar. Embodiments include pyrolysis atmospheres with about 8 ppm, 7 ppm, or 4 ppm $O_2$/Ar.

After pyrolyzing, the CMS membrane that has is formed is cooled to temperature where no further pyrolysis occurs. Generally, this is a temperature where no decomposition products would be evolved from the precursor polymer and may vary from polymer to polymer. Generally, the temperature is 200° C. or less and typically the temperature is taken as 100° C., 50° C. or essentially typical ambient temperatures (20 to 40° C.). The cooling may be at any useful rate, such as passively cooling (e.g., turning off the power to furnace and allowing to cool naturally). Alternatively, it may be desirable to more rapidly cool such as using known techniques to realize faster cooling such as cooling fans or employment of water cooled jackets.

After the cooling, the carbon molecular sieve membrane is exposed to a conditioning atmosphere comprised of a target permeate gas molecule, wherein said exposing desirably occurs before substantial changes in the permeance occurs for the target permeate gas molecule. This time may vary depending on the particular target gas molecule. Illustratively, for propylene or ethylene, the exposing desirably occurs within 5 days of cooling to ambient temperature and the exposing occurs at ambient temperature. Even though the exposing may occur within 5 days, it is desirable to expose the CMS membrane in as short as possible a time upon being cooled such as within 4 days, 2 days, 1 day, 12 hours, 6 hours or even 1 hour. The CMS membranes when being exposed do not need to be fabricated into a separation module (apparatus capable of flowing gas through the CMS membrane), but may merely be exposed upon cooling to the conditioning atmosphere in the same chamber of the furnace used to make the CMS membrane.

The conditioning atmosphere, during the exposing, may be static, flowing or combination thereof during the exposing. Desirably, the conditioning atmosphere is flowing at least a portion of the time during the exposing and preferably is flowing the entire time of the exposing. Even though the CMS membrane may be intermittently exposed to the conditioning atmosphere (e.g., the conditioning atmosphere is intermittently substituted with another gas or vacuum), it is desirable that CMS membrane is continuously exposed to the conditioning atmosphere. In an embodiment, at least a portion of the gas within the conditioning atmosphere flows through the CMS membrane walls.

The pressure of the conditioning atmosphere may be any useful and may range from a pressure below atmospheric pressure to several hundred pounds per square inch (psi). Desirably, the pressure is from about 10 to 200 psi. The pressure may also be varied during the exposing. When exposing the CMS membrane, where at least a portion of the gas in the conditioning atmosphere flows through the walls of the CMS membrane, the pressure differential across the wall may be any useful such as several psi to several hundred psi. Desirably, the pressure differential is from about 1, 5 or 10 to 25, 50 or 100 psi.

The time of exposing, may be any sufficient to realize the improved CMS membrane characteristics desired such as further described below and may vary depending on the particular CMS membrane (e.g., type of precursor polymer and particular pyrolysis conditions). Generally, the amount of time is from several hours to several days or even a week. Typically, the time is from about 4 hours to 4, 3 or 2 days.

The conditioning atmosphere is comprised of a target permeate gas molecule in which permeate gas molecule is one in which is desired to be separated and of a smaller size than other gas molecules within gas feeds of interest such as natural gas streams, air and light hydrocarbon streams, for example from industrial ethylene crackers. It is understood that such streams may be split into multiple streams with multiple CMS membranes in which the permeate molecule in the conditioning atmosphere may be chosen depending the desired separation, which may be in parallel or in series. Illustratively, the conditioning atmosphere desirably is comprised of at least a majority of the target permeate gas molecule. Preferably, the conditioning atmosphere is comprised of at least 75%, 90%, 99% or even essentially 100% of the target permeate molecule. When using a conditioning atmosphere having less than 99% of the permeate molecule, it is desirable that the other gas molecules in the conditioning atmosphere are smaller than the target permeate molecule.

The permeate molecule may be any gas molecule as described above depending on the gas feed stream to be separated. Illustratively, the permeate molecule may be, for example, ethylene when separating ethylene from ethane; propylene when separating propylene from propane; and butylene when separating butylene from butane such as found in light hydrocarbon streams produced in ethylene crackers. Likewise, the conditioning atmosphere may vary in a similar manner for desired separations for possible target permeate gas molecules in natural gas streams, air or other gases (e.g., $H_2$ from a light hydrocarbon such as methane, ethane or propane).

The gas permeation properties of a membrane can be determined by gas permeation experiments. Two intrinsic properties have utility in evaluating separation performance of a membrane material: its "permeability," a measure of the membrane's intrinsic productivity; and its "selectivity," a measure of the membrane's separation efficiency. One typically determines "permeability" in Barrer (1 Barrer=$10^{-10}$ [$cm^3$ (STP) cm]/[$cm^2$ s cmHg], calculated as the flux ($n_i$) divided by the partial pressure difference between the membrane upstream and downstream ($\Delta p_i$), and multiplied by the thickness of the membrane (l).

$$P_i = \frac{n_i l}{\Delta p_i}$$

Another term, "permeance," is defined herein as productivity of asymmetric hollow fiber membranes and is typically measured in Gas Permeation Units (GPU) (1 GPU=$10^{-6}$ [$cm^3$ (STP)]/[$cm^2$ s cmHg]), determined by dividing permeability by effective membrane separation layer thickness.

$$\left(\frac{P_i}{l}\right) = \frac{n_i}{\Delta p_i}$$

Finally, "selectivity" is defined herein as the ability of one gas's permeability through the membrane or permeance relative to the same property of another gas. It is measured as a unitless ratio.

$$\alpha_{i/j} = \frac{P_i}{P_j} = \frac{\left(\frac{P_i}{l}\right)}{\left(\frac{P_j}{l}\right)}$$

In a particular embodiment, the CMS membrane produced by the method enables a carbon hollow fiber CMS membrane that has a permeance of at least 5 GPU for a target gas molecule (permeate) and a selectivity of at least 10 and a stability such that said permeance and selectivity varies less than 20% after being continuously separating a feed gas comprised of a retentate gas molecule and permeate gas molecule for 10 days. Desirably, the permeance and selectivity varies less than 15%, 10% or 5% after being continuously separating a feed gas comprised of a retentate and permeate gas molecule pair for 10, 30 or 60 days. In particular embodiments the permeate/retentate gas molecule pairs may be ethylene/ethane, propylene/propane, butylene/butane, methane/carbon dioxide, methane/water, oxygen/nitrogen, and methane/hydrogen sulfide. Illustratively, the feed gas generally is comprised of at least 50% the permeate gas molecule (e.g., ethylene or propylene) and 25% of retentate gas molecule (e.g., ethane or propane).

In a particular embodiment the CMS membrane produced has a permeance of at least 10 GPU for propylene (permeate) and a selectivity of at least 35 propylene/propane. Desirably, in this embodiment the permeance is at least 12, 15 or even 18 GPU for propylene. Likewise, in this embodiment the selectivity is at least 40, 45 or even 50 for propylene/propane. In another particular embodiment, the CMS membrane produced has a permeance of at least 10 GPU for ethylene (permeate) and a selectivity of at least 6 ethylene/ethane. Desirably, in this embodiment the permeance is at least 15, 18 or even 20 GPU for ethylene. Likewise, in this embodiment the selectivity is at least 8, 10 or even 12 for ethylene/ethane. In a further embodiment, the CMS membrane produced has a permeance of at least 10 GPU for butylene (permeate) and a selectivity of at least 5 butylene/butane. Desirably, in this embodiment the permeance is at least 20, 30 or even 40 GPU for butylene. Likewise, in this embodiment the selectivity is at least 10, 15 or even 30 for butylene/butane.

The CMS membranes are particularly suitable for separating gases that are similar in sizes such as described above and involve flowing a gas feed containing a desired gas molecule and at least one other gas molecule through the CMS membrane. The flowing results in a first stream have an increased concentration of the desired gas molecule and second stream having an increased concentration of the other gas molecule. The process may be utilized to separate any of the aforementioned gas pairs and in particular is suitable for separating ethylene and ethane or propylene and propylene. Likewise, the process exhibits the same stability as it relates to permeance and selectivity over time as described above. When practicing the process, the CMS membrane is desirably fabricated into a module comprising a sealable enclosure comprised of a plurality of carbon molecular sieve membranes that is comprised of at least one carbon molecular sieve membrane produced by the method of the invention that are contained within the sealable enclosure. The sealable enclosure having an inlet for introducing a gas feed comprised of at least two differing gas molecules; a first outlet for permitting egress of a permeate gas stream; and a second outlet for egress of a retentate gas stream.

EXAMPLES

CMS Membrane Preparation:

The CMS membranes were made using 6FDA:BPDA-DAM polymer. The 6FDA:BPDA-DAM was acquired from Akron Polymer Systems, Akron, Ohio. The polymer was dried under vacuum at 110° C. for 24 hours and then a dope was formed. The dope was made by mixing the 6FDA:BPDA-DAM polymer with solvents and compounds in Table 1 and roll mixed in a Qorpak™ glass bottle sealed with a polytetrafluoroethylene (TEFLON™) cap and a rolling speed of 5 revolutions per minute (rpm) for a period of about 3 weeks to form a homogeneous dope.

TABLE 1

Dope formulation
Dope Composition

| Component | weight % | mass (gm) |
|---|---|---|
| 6FDA:BPDA-DAM | 20.0% | 50.20 |
| NMP | 47.5% | 119.23 |
| THF | 10.0% | 25.10 |
| Ethanol | 16.0% | 40.16 |
| LiNO3 | 6.5% | 16.32 |

NMP = N-Methyl-2-pyrrolidone;
THF = Tetrahydrofuran

The homogeneous dope was loaded into a 500 milliliter (mL) syringe pump and allow the dope to degas overnight by heating the pump to a set point temperature of 50° C. using a heating tape.

Bore fluid (80 wt % NMP and 20 wt % water, based on total bore fluid weight) was loaded into a separate 100 mL syringe pump and then the dope and bore fluid were co-extruded through a spinneret operating at a flow rate for of 180 milliliters per hour (mL/hr) for the dope; 60 mL/hr bore fluid, filtering both the bore fluid and the dope in line between delivery pumps and the spinneret using 40 μm and 2 μm metal filters. The temperature was controlled using thermocouples and heating tape placed on the spinneret, dope filters and dope pump at a set point temperature of 70° C.

After passing through a fifteen centimeter (cm) air gap, the nascent fibers that were formed by the spinneret were quenched in a water bath (50° C.) and the fibers were allowed to phase separate. The fibers were collected using a 0.32 meter (M) diameter polyethylene drum passing over TEFLON guides and operating at a take-up rate of 42 meters per minute (M/min).

The fibers were cut from the drum and rinsed at least four times in separate water baths over a span of 48 hours. The rinsed fibers in glass containers and effect solvent exchange three times with methanol for 20 minutes and then hexane for 20 minutes before recovering the fibers and drying them under vacuum at a set point temperature of 110° C. for one hour.

Prior to pyrolyzing the fibers, a sample quantity of the above fibers (also known as "precursor fibers") were tested for skin integrity. One or more hollow precursor fibers were potted into a ¼ inch (0.64 cm) (outside diameter, OD) stainless steel tubing. Each tubing end was connected to a ¼ inch (0.64 cm) stainless steel tee; and each tee was connected to ¼ inch (0.64 cm) female and male NPT tube adapters, which were sealed to NPT connections with epoxy. Pure gas permeation tests were performed in a constant-volume system maintained at 35° C. For each permeation test, the entire system and leak rate was determined to ensure that the leakage was less than 1 percent of the permeation rate of the slowest gas. After evacuating, the upstream end was pressurized (end closest to feed source) of the tube with feed gas (e.g. pure oxygen or pure nitrogen) while keeping the downstream end (end furthest from feed source) under vacuum. The pressure rise was recorded in a constant, known downstream volume over time using LABVIEW software (National Instruments, Austin, Tex.) until reaching steady state. The permeance of each gas was determined through the membrane by the rate of pressure rise, the membrane area and the pressure difference across the membrane. The selectivity of each gas pair as a ratio of the individual gas permeance was calculated.

The hollow fibers were pyrolyzed to form the CMS membranes by placing the precursor fibers on a stainless steel wire mesh plate each of them bound separately to the plate using stainless steel wire. The combination of hollow fibers and mesh plate were placed into a quartz tube that sits in a tube furnace. The fibers were pyrolyzed under an inert gas (argon flowing at a rate of 200 standard cubic centimeters per minute (sccm)). Prior to pyrolyzing the furnace was purged of oxygen by evacuating and then purging the tube furnace for a minimum of four hours to reduce the oxygen level to less than 1 ppm. All of the fibers were heated at a ramp rate of 10° C./minute to a temperature of either 600° C. or 675° C. and held at that temperature from 0, 15 or 60 minutes (soak time). After the soak time, the furnace was shut off, cooled under the flowing argon (passively cooled), which typically cooled in about 4 to 6 hours.

After cooling the fibers were left to sit under the inert gas stream for 24 hours to allow the newly formed CMS to stabilize. Afterwards they were removed from the furnace and potted into modules as described above. The modules were allowed 2 hours to set before being loaded into the permeation testing system. All permeation tests were determined using a 50:50 mixture of propylene and propane in a constant volume system described above with 50 psia upstream and downstream vacuum at 35° C.

TABLE 2

Pyrolysis Conditions

| Example | Temp (° C.) | Atmosphere (sccm/Ar) | Heating Rate (C/min) | Soak Time (min) | Cooling Rate | C3" Permeance (GPU) | C3"/C3 Selectivity | Conditioning time (hr) |
|---|---|---|---|---|---|---|---|---|
| Comparative 1 | 675 | 200 | 10 | 0 | Passive | 23.0 | 28.0 | 0 |
| 1 | 675 | 200 | 10 | 0 | Passive | 19.8 | 31.9 | 24 |
| Comparative 2 | 675 | 200 | 10 | 15 | Passive | 19.3 | 36.6 | 0 |
| 2 | 675 | 200 | 10 | 15 | Passive | 15.4 | 41.3 | 16 |
| 3 | 675 | 200 | 10 | 15 | Passive | 13.2 | 45.6 | 36 |
| 4 | 675 | 200 | 10 | 15 | Passive | 11.9 | 47.0 | 48 |
| Comparative 3 | 675 | 200 | 10 | 60 | Passive | 9.4 | 43.2 | 0 |
| 5 | 675 | 200 | 10 | 60 | Passive | 9.7 | 46.4 | 24 |
| Comparative 4 | 600 | 200 | 10 | 60 | Passive | 40.7 | 14.3 | 0 |
| 6 | 600 | 200 | 10 | 60 | Passive | 40.0 | 15.1 | 24 |
| 7 | 600 | 200 | 10 | 60 | Passive | 26.8 | 18.3 | 43 |
| Comparative 5 | 675 | 200 | 4 | 60 | Passive | 23.6 | 47.8 | 0 |
| 8 | 675 | 200 | 4 | 60 | Passive | 17.1 | 56.8 | 94 |
| 9 | 675 | 200 | 4 | 60 | Passive | 15.6 | 58.8 | 114 |
| 10 | 675 | 200 | 4 | 60 | Passive | 14.2 | 61.6 | 134 |

Comparative Example 1

Vacuum was quickly pulled to remove all ambient gas from the system and immediately after a 50:50 mixture of C3″/C3 (propylene/propane) was fed to the modules having the pyrolyzed fibers as shown in Table 2. For each test steady state was confirmed by taking multiple permeation rate measurements and measuring the permeate using a gas chromatograph; the system was deemed at steady state when these measurements changed by <2%. The permeance and selectivity of propylene is shown Table 2.

Example 1

The same procedure was used as Comparative Example 1, but after determining the initial permeance and selectivity, the CMS membrane module was conditioned in pure flowing propylene for 24 hours constant volume system with 50 psia upstream and downstream vacuum at 35° C. After this conditioning, the CMS membrane module's permeance and selectivity were determined in the same manner as described for Comparative Example 1 and they are shown in Table 2.

Comparative Example 2 and Examples 2-4

Comparative Example 2 was the same as Comparative Example 1 except that the fibers that were used in the CMS module were pyrolyzed as shown in Table 2. Likewise Examples 2-4 used the same pyrolyzed fibers as Comparative Example 2. The conditioning atmosphere was the same as used in Example 1. The permeance of Comparative Example 2 and Examples 2-4 are shown in Table 2.

Comparative Example 3 and Examples 5 Comparative Example 3 was the same as Comparative Example 1 except that the fibers that were used in the CMS module were pyrolyzed as shown in Table 2. Likewise, Example 5 used the same pyrolyzed fibers as Comparative Example 3. The conditioning atmosphere was the same as used in Example 1. The permeance of Comparative Example 3 and Example 5 are shown in Table 2.

Comparative Example 4 and Examples 6 and 7

Comparative Example 4 was the same as Comparative Example 1 except that the fibers that were used in the CMS module were pyrolyzed as shown in Table 2. Likewise Examples 4 and 5 used the same pyrolyzed fibers as Comparative Example 4. The conditioning atmosphere was the same as used in Example 1. The permeance of Comparative Example 4 and Examples 6 and 7 are shown in Table 2.

Comparative Example 5 and Examples 8-10

Comparative Example 5 was the same as Comparative Example 1 except that the fibers that were used in the CMS module were pyrolyzed as shown in Table 2. Likewise Examples 8-10 used the same pyrolyzed fibers as Comparative Example 5. The conditioning atmosphere was the same as used in Example 1. The permeance of Comparative Example 5 and Examples 8-10 are shown in Table 2.

From the results, the method shows that the selectivity may be increased without a substantial loss in permeance, which is necessary to make a commercially viable gas separation system. Likewise, the method can surprisingly realize CMS membranes that have desirable permeance and selectivity such as greater than 10 GPU for propylene and a selectivity of at least 35 propylene/propane. Likewise, it is apparent that the use of a 4° C./min heating rate resulted in membranes having improved selectivity and permeance balance as shown in Examples 8-10.

What is claimed is:

1. A method of making a carbon molecular sieve membrane comprising,
    (i) providing a precursor polymer;
    (ii) heating said precursor polymer to a temperature where the precursor polymer undergoes pyrolysis to form the carbon molecular sieve membrane;
    (iii) cooling the carbon molecular sieve membrane to a temperature where no further pyrolysis occurs; and
    (iv) exposing the carbon molecular sieve membrane to a conditioning atmosphere comprised of a target permeate gas molecule, wherein said exposing occurs where no further pyrolysis occurs, the target permeate gas molecule has size that is larger than any other gas in the conditioning atmosphere, the conditioning atmosphere is flowing through the carbon molecular sieve membrane for at least a portion of the exposing, the exposing occurs within five days of the cooling to the temperature where no further pyrolysis occurs, and the exposing is for at least 2 hours.

2. The method of claim 1, wherein the temperature where no further pyrolysis occurs is from 20 to 40° C.

3. The method of claim 1, wherein the conditioning atmosphere is comprised of at least 99% of the target permeate gas molecule.

4. The method of claim 1, wherein the conditioning atmosphere is continuously flowing through the carbon molecular sieve membrane the entire time of exposing.

5. The method of claim 1, wherein the conditioning atmosphere is at pressure of 10 to 200 pounds per square inch.

6. The method of claim 1, wherein there is a pressure differential across the carbon molecular sieve membrane such that at least a portion of the gas feed is drawn through the carbon molecular sieve membrane.

7. The method of claim 1, wherein the exposing is for at least 4 hours to 4 days.

8. The method of claim 1 wherein the target permeate gas molecule is ethylene, propylene or butylene.

9. The method of claim 8 wherein the carbon molecular sieve membrane has a selectivity of the target permeate gas molecule of at least 6 and a permeance of 10 GPU at 35° C. and the target permeate gas molecule is ethylene and the selectivity is of ethylene from ethane.

10. The method of claim 8 wherein the carbon molecular sieve membrane has a selectivity of the target permeate gas molecule of at least 35 and a permeance of 10 GPU at 35° C. and the target permeate gas molecule is propylene and the selectivity is of propylene from propane.

11. A process for separating a gas molecule from a gas feed comprised of the gas molecule and at least one other gas molecule comprising
    (i) providing the carbon molecular sieve membrane of claim 1; and
    (ii) flowing the gas feed through said carbon molecular sieve membrane to produce a first stream having an increased concentration of the gas molecule and a second stream having an increased concentration of the other gas molecule.

12. The method of claim 11, wherein the gas molecule and other gas molecule is ethylene and ethane or propylene and propane.

13. The method of claim 11, wherein:
the gas molecule and other gas molecule are ethylene and ethane;
the ethylene has a selectivity of at least 6 of ethylene/ethane and a permeance of 10 GPU at 35° C.; and
said selectivity and permeance remain within 20% from the start of flowing the gas feed to after flowing the gas feed for at least 10 days.

* * * * *